| United States Patent [19] | [11] Patent Number: 4,571,215 |
|---|---|
| Hansen | [45] Date of Patent: Feb. 18, 1986 |

[54] VIBRATION DAMPENER APPARATUS

[75] Inventor: Michael S. Hansen, West Valley City, Utah

[73] Assignee: Boroloy Industries International, Inc., Post Falls, Id.

[21] Appl. No.: 502,127

[22] Filed: Jun. 8, 1983

[51] Int. Cl.$^4$ .................. E21B 7/22; E21B 17/02; E21B 17/18

[52] U.S. Cl. .................. 464/180; 173/162 R; 175/321; 267/141.1; 464/20; 464/87

[58] Field of Search .................. 464/180, 18, 19, 20, 464/87; 175/321; 188/378; 267/136, 137, 140.3, 141, 141.1, 153; 173/139, 162; 92/85 R

[56] References Cited

U.S. PATENT DOCUMENTS

| 3,503,224 | 3/1970 | Davidescu | 464/20 |
|---|---|---|---|
| 3,746,330 | 7/1973 | Taciuk | 267/137 |
| 3,947,009 | 3/1976 | Nelmark | 464/20 X |
| 4,139,994 | 2/1979 | Alther | 175/321 X |

OTHER PUBLICATIONS

Drilco Industrial Division of Smith International, Inc., *Drilco Industrial Catalog,* (Q6-823M), pp. 4–7 (printed 1978, U.S.A.).

B. J.-Hughes Machinery Division of Hughes Tool Company, *SMOOTHDRILL:* the Beauty and Brilliance of Simplicity (printed 1981, U.S.A.).

*Primary Examiner*—Stuart S. Levy

*Assistant Examiner*—Lynn M. Sohacki

*Attorney, Agent, or Firm*—Wells, St. John & Roberts

[57] ABSTRACT

A vibration dampener for use on top-drive rotary drills. The apparatus of the present invention comprises a generally cylindrical housing having a cylindrical side, a top, a bottom, and a central divider plate. The top of the housing has an externally threaded bore therethrough which may be connected to the rotary drive of the drill. A central, coaxial tube is slidably received within the housing. The downward end of this tube may be connected to the drill pipe, and the tube thus provides a conduit through which air may be forced.

A generally circular compression plate is connected within the housing to the central tube so as to be adjacent and substantially parallel to the bottom of the housing. A resilient pad is positioned between the compression plate and the central divider plate such that an upward force on the central tube causes the compression plate to be lifted and the resilient pad to be compressed between the compression plate and the divider plate.

A plurality of radial paddle members are connected within the housing to the central tube so as to lie just above the central divider plate. A resilient pad is positioned between each pair of paddles, and each pad is secured in some suitable manner so as to prevent rotational movement of the pad with respect to both the central divider plate and the top of the housing.

15 Claims, 5 Drawing Figures

VIBRATION DAMPENER APPARATUS

BACKGROUND

1. The Field of the Invention

This invention relates to apparatus and methods for dampening vibrations during rotary drilling operations, and, more particularly, to a novel apparatus and method for dampening both axial and torsional vibrations during the operation of a top-drive rotary blasthole drill.

2. The Prior Art

For a number of reasons, it is often necessary or desirable to drill into the earth's surface. Such drilling operations are, for example, one of the principal means by which petroleum and natural gas products are made available for use. Similarly, it is usually necessary to drill into the earth's surface in order to recover fuels from oil shale formations. Likewise, drilling operations are frequently used to both locate and extract various mineral and water deposits.

One of the most common tools for drilling into the earth's surface is a rotary blasthole drill. Such an apparatus comprises a large rig, to which is attached a rotary drive mechanism. Importantly, the drill's rotary drive is capable of being raised and lowered along a substantially vertical axis directly above the formation to be drilled. Additionally, a length of drill pipe is connected to the rotary drive so as to extend downwardly therefrom in a substantially vertical direction; and a drill bit is secured to the downward end of the drill pipe.

When using the rotary blasthole drill apparatus described above, the drill's rotary drive is first activated so as to rotate both the drill pipe and the drill bit at the desired speed. Then, the rotary drive, together with the drill pipe and bit, is lowered, such that the drill bit contacts the surface of the formation to be drilled. A predetermined amount of downward pressure is then continuously applied to the rotating drill pipe and bit, thereby forcing the drill bit to cut downwardly into the formation. Throughout the drilling operation, air is forced through the drill pipe, thereby forcing debris out of the hole and maintaining a clean surface upon which the drill bit may operate.

As soon as the drilled hole is deep enough to accommodate the first length of drill pipe, the drill's rotary drive is disconnected from the drill pipe and raised to its original position. A second length of drill pipe is then connected between the rotary drive and the first length of drill pipe, thereby increasing the effective length of the drill. Thereafter, the rotary drive is again activated, and the drilling operation is continued. This procedure is then repeated until the desired hole depth is achieved.

One of the major problems encountered during rotary blasthole drilling operations is the generation of axial (vertical) and torsional (rotational) vibrations. Generally speaking, these vibrations are simply due to the rotation of the drill and the simultaneous action of the drill bit cutting through the formation. However, it has also been noted that the magnitude of these vibrations is somewhat dependent upon the particular type of formation being drilled. For example, large vibrations are typically generated almost continuously when drilling through extremely hard formations, or when drilling through fractured or layered formations. Similarly, large vibrations are usually generated as the drill bit travels out of a hard formation and into a softer formation, or vice versa.

Vibrations during the operation of a drill may cause difficulties in several ways. First, such vibrations may damage the drill, in that various rigid components of the drill may develop fatigue cracks as a result of prolonged subjection to the vibrations. In addition, even if the drill is not damaged, the vibrations may dramatically increase the wear on the drill bit, thereby reducing the drill bit's useful life. Also, the vibrations may cause large fluctuations in the downward pressure which is applied to the drill, thereby causing the drill bit to bounce or hop on top of the formation being drilled. Significantly, due to the hopping of the bit, the drill may cut slowly and unevenly through the formation. It will be readily appreciated that vibrations also greatly increase the operator noise of the drill. Further, in order to minimize the above-mentioned difficulties, it is often necessary to reduce the drilling speed. Importantly, all of these difficulties may significantly increase both the time needed for drilling and the costs of the drilling operation.

In an effort to eliminate the above-identified problems, those skilled in the art have developed various devices to dampen vibrations during the operation of a rotary drill. Typically, these devices comprise some type of shock absorber which is connected between the drill's rotary drive and the drill pipe. Often, the shock absorber in these devices includes some type of resilient material which absorbs the vibrations and dissipates the energy thereof as heat.

One such prior art dampener comprises two parallel, horizontal plates. One of the plates is connected, either directly or indirectly, to the rotary drive and the other plate is connected to the drill pipe. This apparatus further comprises a resilient pad which is bonded between these two plates, and the entire apparatus has a hole through the center thereof in order to accommodate the air which is forced through the drill pipe.

This type of prior art vibration dampener quite adequately dampens axial (vertical) vibrations. It will be appreciated that, in response to axial vibrations, the two plates of the apparatus are forced closer together. As a result, the resilient pad between the two plates is compressed, thereby dissipating the energy of the axial vibrations as heat.

On the other hand, however, it has been found that this type of prior art vibration dampener does not respond adequately to torsional (rotational) vibrations. When this device is subjected to torsional vibrations, a shearing force is exerted upon the bond between the resilient pad and the two plates. Consequently, over a period of time or in response to large torsional vibrations, the bond between the resilient pad and one or both of the plates is frequently broken. This makes further rotation of the drill virtually impossible and also makes it extremely difficult to thereafter lift the drill pipe out of the hole. In an effort to minimize such difficulties, these prior art dampeners are often provided with flexible safety straps connected between the two plates. Although such straps may be helpful, these safety straps are also frequently broken or damaged due to stress or to contact with tools or other objects.

A second type of prior art vibration dampener likewise comprises two parallel, horizontal plates, one of which is connected to the drill's rotary drive, either directly or indirectly, and the other of which is connected to the drill pipe. These two plates are connected by a plurality of bonded segments, the segments being attached to the plates so as to define a cylinder which is substantially concentric with the drill pipe. Each bonded segment comprises two, rigid lugs, one of which is positioned upwardly and the other, downwardly; and the two lugs are each bonded to opposite sides of a strip of resilient material. Importantly, these bonded segments are attached to the two plates such that a counterclockwise rotation of the lower plate with respect to the upper plate causes the resilient strip of each bonded segment to be compressed by the two adjacent lugs.

This second type of prior art vibration dampener very adequately dampens torsional (rotational) vibrations. Since the drill rotates in a clockwise direction, torsional vibrations typically exert a counterclockwise force on the drill pipe, thereby causing the lower plate of the dampener apparatus to be rotated slightly in a counterclockwise direction with respect to the upper plate. As mentioned above, such rotation causes the resilient strip of each bonded segment to be compressed, thereby dissipating the energy of the torsional vibrations as heat.

In spite of its ability to dampen torsional vibrations, however, it has been found that this second type of prior art vibration dampener does not adequately respond to axial vibrations. Axial vibrations exert a sheering force on the bond between the resilient strip and the two lugs of each bonded segment. Consequently, due to prolonged use of the apparatus or to large axial vibrations, the bond in one or more of the bonded segments is frequently broken. Therefore, as with the first type of prior art dampener described above, this dampener also requires some kind of safety feature in order to permit the drill pipe to be thereafter rotated and/or lifted.

In addition to the above-mentioned problems, there are several significant problems which are common to both of these prior art vibration dampeners. First, the resilient members in both of these dampeners are typically exposed to dirt and the elements. Such exposure causes accelerated wear of these resilient members and significantly reduces their useful life. In addition, tools and other objects may easily come into contact with the exposed, resilient members, thereby damaging such members and reducing the effectiveness of the vibration dampener. Further, these prior art dampeners typically include a plurality of bolts or screws whose heads lie against the top and/or bottom of the dampener. These bolts or screws must be frequently checked and tightened in order to prevent them from coming loose during operation of the drill. In addition, the bolts or screws are often damaged due to contact with the deck platform of the drilling rig.

It will be readily appreciated that the problems discussed above may give rise to a number of undesirable consequences. First, the prior art vibration dampeners tend to wear out within a relatively short time, thus necessitating frequent repair and/or replacement. Of course, this may substantially increase the costs of the drilling operation. In addition, since both the weight of the drill pipe and the force of the vibrations tend to increase with hole depth, the structural instability of the prior art devices places a natural limit on the maximum drilling depth which can be attained. Further, the prior art devices may prove somewhat dangerous since, when the prior art vibration dampeners become fatigued or damaged, some of the component parts may fall from the device and injure nearby workers.

Accordingly, it would be an improvement in the art to provide an apparatus and method which is effective for dampening both axial and torsional vibrations which are generated during rotary drilling operations. It would also be an improvement in the art to provide a vibration dampener wherein there is no possibility of breaking a bond between a resilient member and a rigid member. Additionally, it would be an improvement in the art to provide a vibration dampener which would permit the drill pipe to be rotated and lifted even after the dampening member is completely fatigued. Further, it would be an improvement in the art to provide a vibration dampener wherein the resilient dampening members are not exposed to dirt or the elements or to contact with tools or other objects. It would also be an improvement in the art to provide a vibration dampener which does not include bolts or screws which may come loose or be damaged during operation of the drill. Such a device and method is disclosed and claimed herein.

BRIEF SUMMARY AND OBJECTS OF THE INVENTION

The present invention is directed to an apparatus for dampening axial and torsional vibration along an axis. It comprises first and second coaxial rotational members capable of axial and rotational motion relative to one another along their common axis. The first rotational member includes a first rigid radial element having first and second opposed axial sides. The second rotational member includes a second rigid radial element having a side facing and spaced axially from the first side of the first radial element. First resilient means is located between the first and second rotational members and is axially engaged between the first side of the first radial element and the side of the second radial element for absorbing only axial vibrations transferred from one rotational member to the other along their common axis.

The second rotational member also includes a first rigid axial element located axially adjacent to the second side of the first radial element and having sides spaced equiangularly about the axis. The first rotational member includes a second rigid axial element located axially adjacent to the second side of the first element and between the sides of the first axial element. Second resilient means is located between the first and second rotational members and is radially engaged between the first and second axial members for absorbing only torsional vibrations transferred from one rotational member to the other along their common axis.

The present invention is more specifically directed to a vibration dampener for use on top-drive rotary drills. The apparatus of the present invention comprises a generally cylindrical housing having a cylindrical side, a top, a bottom, and a central divider plate. The top of the housing has an externally threaded bore therethrough which may be connected to the rotary drive of the drill. A central, coaxial tube is slidably received within the housing so as to extend from the bore in the top of the housing through both the central divider plate and the bottom of the housing. The downward end of this tube may be connected to the drill pipe, and the tube thus provides a conduit through which air may be forced.

A generally circular compression plate is connected within the housing to the central tube so as to be adjacent and substantially parallel to the bottom of the housing. A resilient pad is positioned between the compression plate and the central divider plate such that an upward force on the central tube causes the compression plate to be lifted and the resilient pad to be compressed between the compression plate and the divider plate.

A plurality of radial paddle members are connected within the housing to the central tube so as to lie just above the central divider plate. A resilient pad is positioned between each pair of paddles, and each pad is secured in some suitable manner so as to prevent rotational movement of the pads with respect to both the central divider plate and the top of the housing. Thus, any rotation of the central tube about its vertical axis causes each resilient pad to be compressed by one of the adjacent paddles.

In use, the top of the housing is first connected to the rotary drive of the drill, and the downward end of the central tube is connected to the drill pipe. When the drill's rotary drive is then activated, the vibration dampener, together with the drill pipe and bit, rotates at the preselected speed. Thereafter, as the drill cuts downwardly into the formation, axial and torsional vibrations are generated. In response to axial vibrations, the compression plate of the vibration dampener is raised, thereby compressing a resilient pad and dissipating the energy of the axial vibrations. Similarly, in response to torsional vibrations, the central tube of the vibration dampener is rotated about its vertical axis, thereby causing the attached paddles to compress respective resilient pads so as to dissipate the energy of the torsional vibrations.

It is, therefore, a primary object of the present invention to provide a vibration dampener apparatus and method for use with top-drive rotary blasthole drills which effectively dampens both axial and torsional vibrations.

It is also an object of the present invention to provide a vibration dampener for rotary blasthole drills which does not exert a shearing force on a bond between a rigid member and a resilient member.

Additionally, it is an object of the present invention to provide a vibration dampener for rotary blasthole drills which dampens both axial and torsional vibrations by compressing a resilient dampening member.

It is another object of the present invention to provide a vibration dampener which remains structurally sound even after the dampening means has become completely fatigued, thereby continuing to permit the drill pipe to be rotated and lifted.

It is still another object of the present invention to provide a vibration dampener having a resilient dampening member, the dampening member being protected from exposure to dirt, foreign objects, and the elements.

Further, it is an object of the present invention to provide a vibration dampener for rotary blasthole drills which has a long operating life and which is virtually maintenance free.

These and other objects and features of the present invention will become more fully apparent from the following description and appended claims taken in conjunction with the accompanying drawings.

DETAILED DESCRIPTION OF THE PREFERRED EMBODIMENTS

It will be readily appreciated that the components of the present invention, as generally described and illustrated in the figures herein, could be arranged and designed in a wide variety of different configurations. Thus, the following more detailed description of the embodiment of the apparatus and method of the present invention, as represented in FIGS. 1–5, is not intended to limit the scope of the invention as claimed, but it is merely representative of one presently preferred embodiment of the invention.

Figure 1:
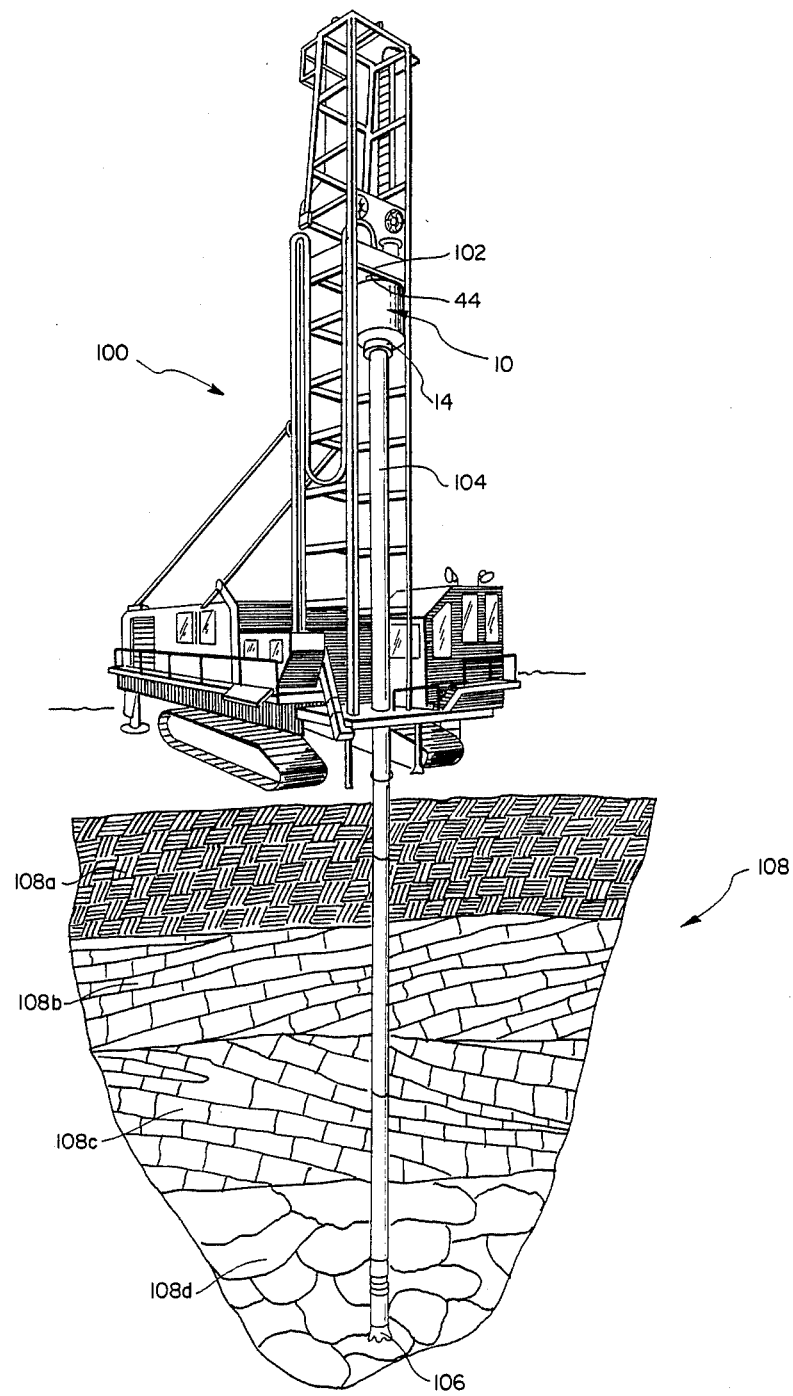
FIG. 1 is a perspective view of a rotary blasthole drill which includes one presently preferred embodiment of the vibration dampener apparatus of the present invention.

The vibration dampener apparatus of the present invention, generally designated 10, is illustrated in FIG. 1 as it would be used with a typical top-drive rotary blasthole drill 100. As depicted in FIG. 1, vibration dampener 10 is connected between drill pipe 104 and rotary drive 102 of drill 100. Thus, activation of rotary drive 102 causes vibration dampener 10, drill pipe 104, and drill bit 106 to rotate, thereby cutting a hole downwardly through formation 108. As discussed above, as drill bit 106 cuts through layers 108a, 108b, 108c, and 108d of formation 108, significant axial and torsional vibrations are generated. These vibrations are transmitted from drill bit 106 along drill pipe 104 to vibration dampener 10. The energy of these vibrations is then dissipated by vibration dampener 10, thereby permitting more efficient operation of drill 100.

Figure 2:
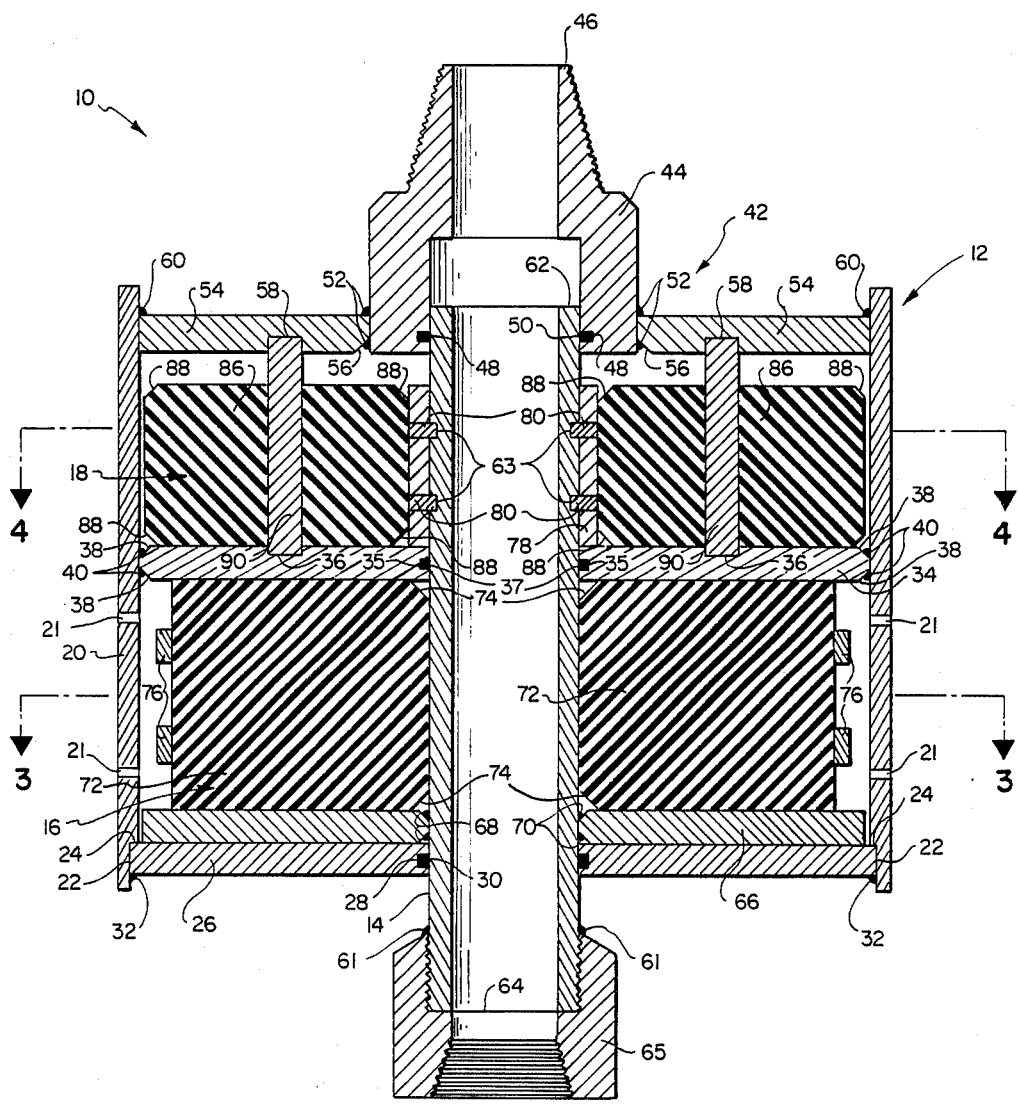
FIG. 2 is a vertical cross-sectional view of a one presently preferred embodiment of the vibration dampener apparatus of the present invention.

The specific construction of vibration dampener 10 is illustrated more particularly in FIGS. 2–5. With particular reference to FIG. 2, vibration dampener 10 comprises a first rotational member shown as a housing 12, a second rotational member shown as a center tube 14, a first resilient means shown as an axial vibration dampener 16, and a second resilient means shown as a torsional vibration dampener means 18. Each of these elements is discussed separately below.

Housing 12 is substantially cylindrical in shape and comprises side 20, and a series of radial elements shown as a bottom plate 26, a center plate 34, and a top 42 that includes a top plate 54. Side 20 is formed as a rigid, right circular cylinder. As illustrated in FIG. 2, side 20 is preferably provided with one or more weep holes 21 through the lower portion thereof, for reasons which will be discussed below. In addition, the lower end 22 of side 20 has an enlarged inside diameter, such that a shelf 24 is provided adjacent the bottom end of side 20. The purpose of shelf 24 will become more fully apparent from the discussion which follows. Optionally, side 20 may also be provided with a similar enlarged diameter portion and shelf adjacent the top end thereof.

Bottom plate 26 is substantially circular in shape and is formed so as to fit snugly within the diametrally enlarged end of side 20 and rest against shelf 24, as shown. Bottom plate 26 is secured within the bottom end of side 20 in some suitable manner. For example, bottom plate 26 may be secured to the inside surface of side 20 by means of a weld 32. Importantly, bottom plate 26 has a central hole therein such that tube 14 may pass through the center of bottom plate 26, as will be more fully described below. Also, an annular groove 28 is formed within the hole in bottom plate 26, and an O-ring 30 is inserted in groove 28. The purpose of O-ring 30 will become more fully apparent from the discussion which follows.

Center plate 34 is also substantially circular in shape, and it is positioned within side 20 so as to be substantially parallel to bottom plate 26. It has opposed first and second sides which divide housing 12 into two, approximately equal axial compartments. Center plate 34 is secured within side 20 in some suitable manner. For example, center plate 34 may be secured to the inside surface of side 20 by means of welds 40. In such case, center plate 34 may advantageously be formed with beveled portions 38 adjacent the outward edges thereof in order to facilitate the placement of welds 40. Importantly, center plate 34 also has a central hole therein, such that tube 14 may pass through the center of center plate 34. Similar to bottom plate 26, an annular groove 35 is formed within the hole in center plate 34, and an O-ring 37 is inserted in groove 35. In addition, center plate 34 may have countersunk bores 36 therein, for purposes which will be discussed more fully below.

Top 42 of housing 12 is positioned within the top end of side 20 so as to be substantially parallel to both bottom plate 26 and center plate 34. Although top 42 may be formed as a single unit, it is presently preferred that top 42 be formed as two, separate members, in order to facilitate manufacture of top 42. Accordingly, as depicted in FIG. 2, top 42 preferably comprises adapter tube 44 and top plate 54.

Adapter tube 44 has an inside diameter which is sufficient to receive tube 14 therein, as will be discussed more fully below. In addition, a lower portion of the inside surface of adapter tube 44 has an annular groove 48 formed therein; an O-ring 50 is inserted in groove 48, for reasons which will become more fully apparent from the discussion which follows. Importantly, the upper end 46 of adapter tube 44 is threaded, or otherwise provided with a suitable adapter means, such that adpater tube 44 may be readily connected to rotary drive 102 of drill 100 (see FIG. 1).

Top plate 54 of top 42 is substantially circular in shape and is formed so as to fit snugly within side 20, as shown. Top plate 54 is secured within the top end of side 20 in some suitable manner. For example, top plate 54 may be secured to the inside surface of side 20 by means of a weld 60.

Importantly, top plate 54 has a central hole therein which snugly receives the lower end of adapter tube 44. Adapter tube 44 is secured to top plate 54 in some suitable manner. For example, adapter tube 44 may be secured to top plate 54 by means of welds 52. In such case, top plate 54 may advantageously include a beveled portion 56 adjacent the central hole therein in order to facilitate the placement of welds 52. Top plate 54 may further be provided with countersunk bores 58, for reasons which will be discussed more fully below. Importantly, such countersunk bores 58 in top plate 54 should lie directly above countersunk bores 36 in center plate 34.

Although housing 12 is described above as being a generally cylindrical unit which is formed by welding rigid plates to the inside surface of a rigid tube, housing 12 may be formed in a number of different ways and may have a number of different configurations. First, bottom plate 26, center plate 34, and top 42 may be secured in any suitable manner; it is presently preferred, however, that the securement means not include bolts or screws which may be damaged by contact with the deck platform of the drilling rig. In addition, housing 12 may have any suitable shape. For example, housing 12 could be substantially rectangular or elliptical in cross-section. However, due to the generally circular nature of torsional vibrations, a cylindrical shape for housing 12 is presently preferred. Further, although housing 12 has been described as being constructed of substantially solid members, it will be appreciated that housing 12 could also be partially constructed of a suitable lattice or screen.

Tube 14 of vibration dampener 10 is preferably a substantially cylindrical member which is slidably received within housing 12 so as to be substantially coaxial with housing 12. As illustrated in FIG. 2, tube 14 extends through the hole in bottom plate 26, through the hole in center plate 34, and into adapter tube 44 of top 42. However, for reasons which will become more fully apparent from the discussion which follows, the top end 62 of tube 14 does not initially extend clear to the top of adapter tube 44.

Importantly, the outside surface of tube 14 forms an air-tight seal in combination with O-ring 30 in bottom plate 26, O-ring 37 in center plate 34, and O-ring 50 in adapter tube 44. Thus, air may be forced through tube 14 without any leakage into housing 12. Similarly, tube 14 may slide vertically within housing 12 without any air entering housing 12 through the central hole in bottom plate 26. Thus, when housing 12 is constructed as described above, it will be appreciated that the contents of housing 12 are substantially protected from exposure to air, dirt, foreign objects, and the elements.

The bottom end 64 of tube 14 is formed as, or provided with, a suitable connector, such that tube 14 may be readily connected to a length of drill pipe 104 (see FIG. 1). For example, the bottom portion of tube 14 may have external threads which receive corresponding internal threads of a separate connector 65, and connector 65 may be secured on tube 14 by means of welds 61. Advantageously, by permitting the use of various kinds of connectors 65, such a configuration for tube 14 allows vibration dampener 10 to be used with virtually any drill pipe configuration.

Figure 3:
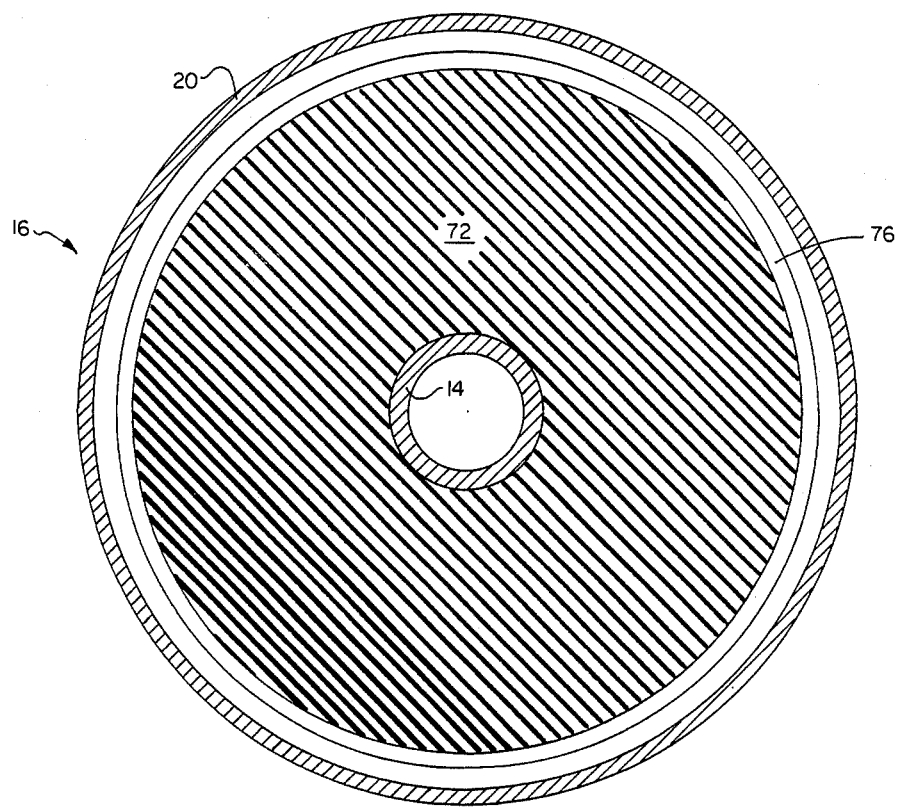
FIG. 3 is a horizontal cross-sectional view taken along lines 3—3 of FIG. 2.

As depicted in FIGS. 2 and 3, axial dampener means 16 of vibration dampener 10 is located within the lower compartment of housing 12. Axial dampener means 16 comprises a compression plate 66 and a suitable shock absorber, such as, for example, a resilient pad 72.

Compression plate 66 extends radially outward from tube 14 and may have any suitable shape. For example, as illustrated in FIG. 2, compression plate 66 may be formed as a substantially annular disc. Although compression plate 66 may be formed of a suitable lattice or screen, it is presently preferred that compression plate 66 be a solid member, in order to increase its structural stability and minimize the wear on resilient pad 72. As shown in FIG. 2, compression plate 66 is positioned within housing 12 so as to lie on top of and be substantially parallel to bottom plate 26. Importantly, the outside diameter of compression plate 66 is somewhat less than the inside diameter of side 20, such that compression plate 66 may move freely in a vertical direction within housing 12. Compression plate 66 is secured to tube 14 in some suitable manner. For example, compression plate 66 may be secured to tube 14 by means of welds 70. In such case, compression plate 66 may advantageously be provided with beveled portions 68 adjacent the inward edges thereof in order to facilitate the placement of welds 70.

A shock absorber is positioned between compression plate 66 and center plate 34 so as to resist any upward movement of compression plate 66 and dissipate the energy incident thereto. As mentioned above, a suitable shock absorber may, for example, comprise an annular resilient pad 72, which rests on top of compression plate 66 so as to surround tube 14. Significantly, resilient pad 72 extends from compression plate 66 to center plate 34, thereby filling substantially the entire lower portion of housing 12. Importantly, however, resilient pad 72 has an outside diameter which is somewhat less than the inside diameter of side 20, thereby permitting adequate compression of resilient pad 72, as described more fully below.

It should be noted that although resilient pad 72 is described and illustrated as being a substantially circular ring, resilient pad 72 may have any suitable configuration. Advantageously, resilient pad 72 is provided with annular lips 76 around the outward surface thereof in order to prevent tearing of resilient pad 72 during compression. Also, resilient pad 72 may be provided with beveled portions 74 adjacent the corners thereof, in order to minimize wear on the corners.

Figure 4:
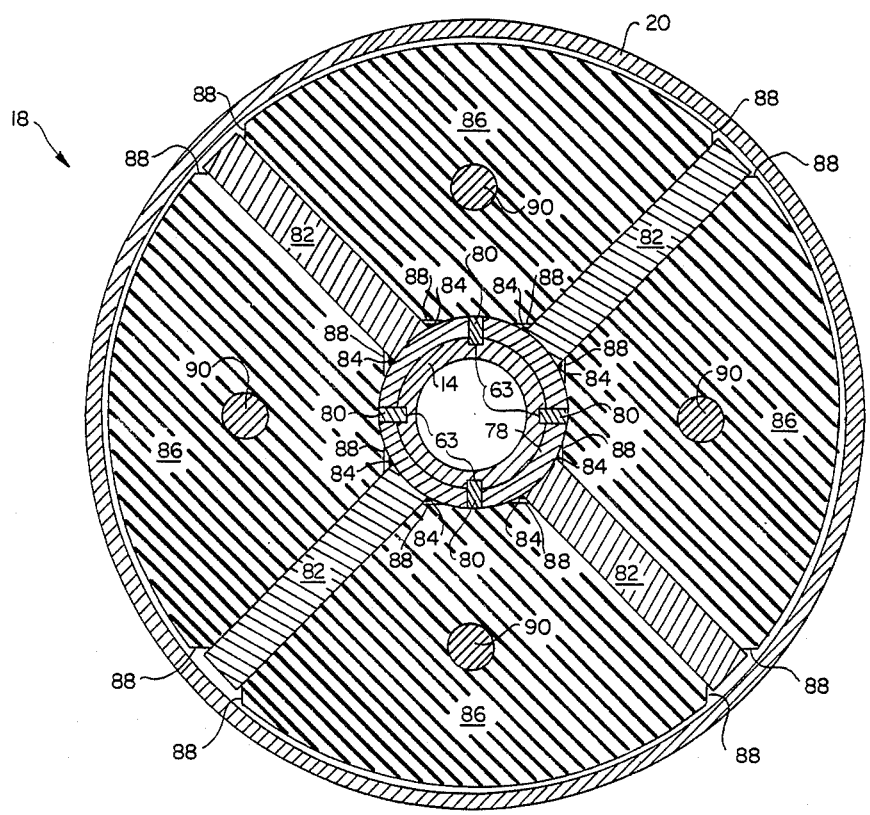
FIG. 4 is a horizontal cross-sectional view taken along lines 4—4 of FIG. 2.

As depicted in FIGS. 2 and 4, torsional dampener means 18 of vibration dampener 10 is located within the upper compartment of housing 12. As shown best in FIG. 4, torsional dampener means 18 comprises a rigid paddle wheel structure and a suitable shock absorber, such as, for example, resilient pads 86.

The paddle wheel structure of torsional dampener means 18 may be formed in any suitable manner. For example, as depicted in FIG. 4, the paddle wheel structure may comprise a ring 78 which surrounds tube 14 and which has a plurality of first axial elements, shown as paddles 82, extending radially outward therefrom. In such case, paddles 82 are firmly secured to ring 78 in some manner. For example, paddles 82 may be secured to ring 78 by means of welds 84. Optionally, a suitable reinforcing plate or gussets may also be secured between paddles 82 and ring 78 in order to provide further support for paddles 82. In addition, the paddle wheel structure is firmly secured to tube 14 in some suitable manner. For example, as illustrated in FIG. 4, ring 78 may be secured to tube 14 by means of pins 80 which extend through ring 78 and into countersunk bores 63 in tube 14.

Any suitable number of paddles 82 may be used to form the paddle wheel structure. For example, the paddle wheel may include four paddles, as illustrated in FIG. 4. In addition, paddles 82 may be formed in any suitable manner. For example, paddles 82 may be substantially solid members each having two opposed sides. Alternatively, however, paddles 82 may be formed of a suitable lattice or screen, although such a configuration may tend to decrease the structural stability of the paddles and increase the wear on resilient pads 86. Importantly, the length of paddles 82 is such that paddles 82 may move freely within housing 12 without contacting side 20. Also, as shown in FIG. 2, the height of ring 78 and paddles 82 is somewhat less than the height of the upper compartment of housing 12, for reasons which will become apparent from the discussion which follows.

A shock absorber is positioned between paddles 82 so as to resist any rotational movement of paddles 82 and dissipate the energy incident thereto. As mentioned above, a suitable shock absorber, may, for example, comprise resilient pads 86, which are configured so as to substantially fill the space between each pair of paddles 82. The height of resilient pads 86 may be substantially the same as the height of paddles 82, as depicted in FIG. 2. Alternatively, however, resilient pads 86 may extend completely from center plate 34 to top 42. Advantageously, resilient pads 86 are provided with beveled corners 88 in order to minimize the wear on corners 88.

Resilient pads 86 are secured with respect to housing 12 in some suitable manner. For example, resilient pads 86 may be secured by means of second axial elements, shown as posts 90, having sides which pass through the center of resilient pads 86 and are received within countersunk bores 36 and 58 of center plate 34 and top plate 54, respectively. Alternatively, resilient pads 86 may be secured by means of suitable walls or screens which extend radially inward from side 20 between paddles 82.

Vibration dampener 10 may be formed in any suitable manner and from a number of suitable materials. For example, the rigid members of vibration dampener 10 may be formed of steel. The shock absorbers of vibration dampener 10 are preferably formed from some resilient material, such as, for example, rubber or a suitable elastomeric material. Alternatively, however, the shock absorbers may comprise a mechanical shock absorbing means, such as, for example, springs. Moreover, vibration dampener 10 may be formed in a wide variety of different configurations. For example, vibration dampener 10 may be formed such that torsional dampener means 18 is within the lower compartment of housing 12 and axial dampener means 16 is within the upper compartment of housing 12.

In use, vibration dampener 10 is connected to drill 100 in some suitable manner. For example, as illustrated in FIG. 1, adapter tube 44 of top 42 may be connected to rotary drive 102 of drill 100; and drill pipe 104 is then attached to connector 65 of tube 14 of vibration dampener 10. Alternatively, however, vibration dampener 10 may be connected to the downward end of drill pipe 104 so as to be adjacent drill bit 106.

Figure 5:
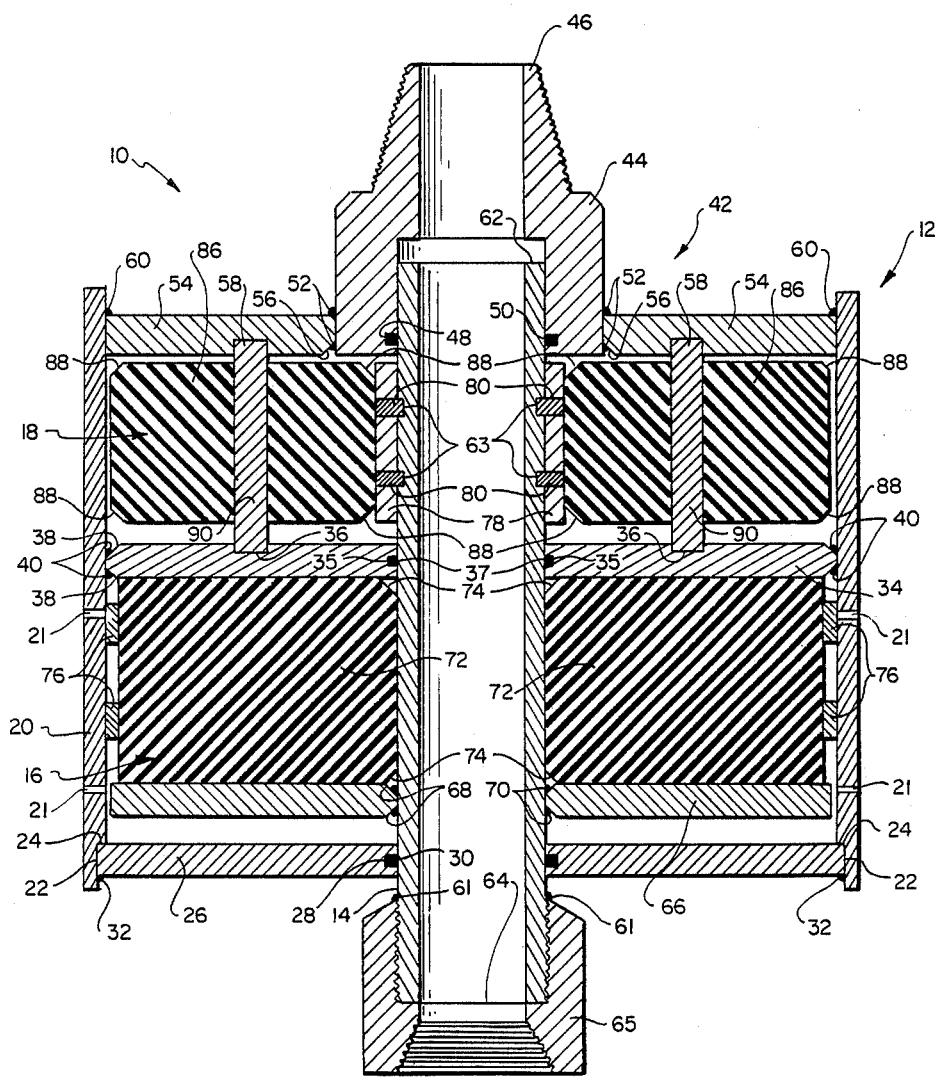
FIG. 5 is a vertical cross-sectional view of the embodiment of FIG. 2 which illustrates the position of the vibration dampener's internal component parts when the axial vibration dampener means is in a compressed position.

When rotary drive 102 is thereafter activated, vibration dampener 10 is rotated, thereby rotating drill pipe 104 and drill bit 106 at the desired speed. Then, as axial vibrations are transmitted along drill pipe 104 to vibration dampener 10, compression plate 66 compresses resilient pad 72; any excess air within housing 12 is allowed to escape through weep holes 21 in side 20, thus preventing O-rings 30 and 37 from being dislodged. Thus, as depicted in FIG. 5, the fact that paddles 82 and ring 78 of torsional dampener means 18 are somewhat shorter than the height of the upper compartment of housing 12 permits tube 14 to travel upward within housing 12 and to extend further into adapter tube 44, thereby permitting adequate compression of resilient pad 72. Similarly, as torsional vibrations are transmitted along drill pipe 104 to vibration dampener 10, tube 14 rotates within housing 12 so as to compress resilient pads 86.

From the above discussion, it will be appreciated that the present invention provides a vibration dampener apparatus and method for use with top-drive rotary blasthole drills which effectively dampens both axial and torsional vibrations. Since the resilient members in the vibration dampener of the present invention are not bonded to rigid members, the present invention also provides a vibration dampener for rotary blasthole drills which does not exert any shearing force on a bond between a rigid member and a resilient member. In addition, the present invention provides a vibration dampener for rotary blasthole drills which dampens both axial and torsional vibrations by compressing a resilient member. Also, due to the vibration dampener's rigid outer housing, the present invention provides a vibration dampener which remains structurally sound even after the dampening means has become completely fatigued, thereby continuing to permit the drill pipe be rotated and lifted. Further, since the vibration dampener of the present invention is substantially air-tight and has a rigid outer housing, the present invention provides a vibration dampener having a resilient dampening member, the dampening member being protected from exposure to dirt, foreign objects, and the elements. Therefore, the present invention has provided a vibration dampener for rotary blasthole drills which has a long operating life and which is virtually maintenance free.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. An apparatus for dampening axial and torsional vibration along an axis, comprising:
   a first rotational member having a central axis;
   a second rotational member coaxially mounted to said first rotational member for axial and rotational motion relative to said first rotational member along said axis;
   said first rotational member including a first rigid radial element having first and second opposed sides;
   said second rotational member including a second rigid radial element having one side facing and spaced axially from said first side of the first radial element;
   first resilient means located between said first and second rotational members and axially engaged between said first side of the first radial element and said one side of the second radial element for absorbing only axial vibrations transferred from one rotational member to the other along said axis;
   said second rotational member further including a first rigid axial element located axially adjacent said second side of the first radial element and having sides angularly spaced about said axis;
   said first rotational member further including a second rigid axial element located axially adjacent said second side of the first radial element and between said sides of the first axial element; and
   second resilient means located between said first and second rotational members and radially engaged between said first and second axial members for absorbing only torsional vibrations transferred from one rotational member to the other about said axis.

2. The apparatus of claim 1 wherein said first and second rotational members are substantially cylindrical in shape and wherein the first radial element is slidably and rotatably sealed against said second rotational member.

3. The apparatus of claim 1 wherein said first and second rotational members are substantially cylindrical in shape and wherein the first radial element is slidably and rotatably sealed against said second rotational member, and wherein said first rotational member further comprises:
   a third rigid radial element located axially outward from said second radial element for enclosing a first compartment including said first resilient means, said third radial element being slidably and rotatably sealed against said second rotational member; and
   a fourth rigid radial element located axially outward from said first and second axial elements for enclosing a second compartment including said second resilient means.

4. The apparatus of claim 1 wherein said second axial means comprises:
   at least one radial paddle extending outwardly from said second rotational member.

5. The apparatus of claim 1 wherein said second axial means comprises:
   a plurality of equiangularly spaced radial paddles extending outwardly from said second rotational member;
   said second resilient means comprising a plurality of resilient pads positioned between adjacent pairs of paddles about said axis, said resilient pads being configured so as to substantially fill the space between the adjacent paddles.

6. The apparatus of claim 1 wherein said second axial means comprises:
   a plurality of equiangularly spaced radial paddles extending outwardly from said second rotational member;
   said second resilient means comprising a plurality of resilient pads positioned between adjacent pairs of paddles about said axis, said resilient pads being configured so as to substantially fill the space between the adjacent paddles;
   said first axial means comprising a plurality of posts fixed about said first radial element, each post extending through a complimentary aperture formed in one of said pads for securing each pad to said first radial element.

7. The apparatus of claim 1 wherein said second axial means comprises:
   four paddles equiangularly arranged about said axis on said second rotational member;
   said second resilient means comprising four substantially wedge-shaped pads filling the space between adjacent paddles.

8. An apparatus for dampening both axial and torsional vibrations between coaxial driving and driven members, comprising:
   a housing having a central axis, said housing being adapted to be coaxially connected to one of the driving or driven members;
   a tube coaxially mounted within the housing for sliding and rotational motion relative to the housing with respect to said axis, said tube being adapted to be coaxially connected to the remaining one of the driving or driven members;

said housing including a rigid center plate extending radially inward toward said tube and having first and second opposed axial sides;

said tube including a compression plate extending radially outward toward said housing;

first resilient means located within said housing and engaged between said first side of the center plate and said compression plate for absorbing only axial vibrations transferred between the tube and housing;

second resilient means located within said housing adjacent to the remaining axial side of said center plate for absorbing only torsional vibrations between the tube and housing;

first axial means on said housing for radially engaging said second resilient means; and second axial means on said tube spaced from said first axial means for engaging said second resilient means in opposition to said first axial means.

9. The apparatus of claim 8 wherein the housing is substantially cylindrical in shape and the center plate extends inwardly to slidably engage said tube, and wherein said housing further comprises:

first plate means at one axial end of the housing outward from said compression plate for enclosing a first compartment including said first resilient means; and second plate means axially outward from said first and second axial means for enclosing a second compartment containing said second resilient means.

10. The apparatus of claim 8 wherein said second axial means comprises:

at least one radial paddle extending outwardly from said tube.

11. The apparatus of claim 8 wherein said second axial means comprises:

a plurality of equiangularly spaced radial paddles extending outwardly from said tube;

said second resilient means comprising a plurality of resilient pads positioned between adjacent pairs of paddles about said axis, said resilient pads being configured so as to substantially fill the spaces between the adjacent paddles.

12. The apparatus of claim 8 wherein said second axial means comprises:

a plurality of equiangularly spaced radial paddles extending outwardly from said tube;

said second resilient means comprising a plurality of resilient pads positioned between adjacent pairs of paddles about said axis, said resilient pads being configured so as to substantially fill the space between the adjacent paddles;

said first axial means comprising a plurality of posts fixed about said center plate, each post extending through a complementary aperture formed in one of said pads for securing each pad to said center plate and housing.

13. The apparatus of claim 8 wherein said second axial means comprises:

four paddles equiangularly spaced about said tube and extending outwardly therefrom;

said second resilient means comprising four substantially wedge-shaped pads filling the space between adjacent paddles.

14. The apparatus of claim 8 wherein the compression plate and the first resilient means each surround the tube and have substantially annular configurations.

15. The apparatus of claim 8 wherein the housing is substantially air-tight.

* * * * *